United States Patent
Ruff, Jr.

(10) Patent No.: US 7,072,516 B1
(45) Date of Patent: Jul. 4, 2006

(54) CHARACTERISTIC-BASED CLASSIFICATION SYSTEM

(76) Inventor: Arthur W. Ruff, Jr., 5780 Jackson Dr., #25, La Mesa, CA (US) 91942

( * ) Notice: Subject to any disclaimer, the term of this patent is extended or adjusted under 35 U.S.C. 154(b) by 0 days.

(21) Appl. No.: 11/161,839

(22) Filed: Aug. 18, 2005

(51) Int. Cl.
*G06K 9/62* (2006.01)
*G06K 9/54* (2006.01)
*G06F 7/00* (2006.01)

(52) U.S. Cl. .................. 382/224; 382/305; 707/100
(58) Field of Classification Search ............. 382/100, 382/181, 203, 218, 224, 305; 707/2–7, 100
See application file for complete search history.

(56) References Cited

U.S. PATENT DOCUMENTS 6,684,562 B1 * 2/2004 Schade .................. 43/87

OTHER PUBLICATIONS

Edwin Eugene Ott (How to Identify Snakes), Aug. 25, 2000.*
Frazin Mokhtarian et al. (indexing an image database by shape content using curvature scale space—1996).*
Tom Spinker (florida and Georgia snake identification, 2001-2005).*

* cited by examiner

*Primary Examiner*—Kanjibhai Patel
(74) *Attorney, Agent, or Firm*—Michael L. Greenberg, Esq.; Greenberg & Lieberman, LLC

(57) ABSTRACT

Characteristics can be stored in a computer databank for various plants, animals, and items. When a user wants to identify a particular plant, animal or item, the user supplies the characteristics that are readily ascertained. After the user has entered the characteristics, the standardized reverse logic databank of the present invention will cull out the items that have non-compatible characteristics and identify the item or provide a list of the possible identity matches for the unknown.

4 Claims, 2 Drawing Sheets

CHARACTERISTIC-BASED CLASSIFICATION SYSTEM

FIELD OF THE INVENTION

The present invention simplifies the identification of items; more specifically, the present invention concerns items that have a general group of identifiable characteristics. Since each item has a specific "set" of general characteristics, each item can be separated and identified rapidly with the present invention.

The present invention uses a reverse type of logic and removes items that have non-compatible characteristics. A computer databank of non-compatible characteristics provides a standardized base for the key.

BACKGROUND OF THE INVENTION

Sometimes, a person sees a plant, animal, or item that the person would like to identify. Also, it is the business of some scientific investigators to identify specific items. For example, it is the work of a herpetologist to identify snakes.

A problem can occur when an individual encounters a snake, and although the individual can determine that the snake has eyes with vertical pupils and that the snake has a rattle on its tail, the individual cannot identify the snake. So, an efficient system or method that assists an individual to identify items is required.

Currently, an individual may have a guidebook, and in the guidebook there may be a key to identify the items studied. If an individual sees a snake and wants to identify the snake, the individual can look at a snake guidebook. In the book, a dichotomy key can require answers to specific questions, such as, "What is the shape of snake's pupil?", "Is there a rattle on the end of the tail?", or "Does the snake have stripes?" When the user answers each question in the dichotomy key, the answer to each question is linked to an additional question until the snake is identified. After answering questions and moving from question to question through the dichotomy key, the user should end up with a specific name for the snake. The procedure that is described is the typical format used by a dichotomy key and is how an individual would probably identify a snake, plant, bird, or other item.

Dichotomy keys assume that the user is able to identify specific characteristics of the animal, plant, or item. In real-life situations, the user cannot always ascertain the specific characteristics that the key requires. A user may want to identify a snake that was run over by a car (dead on road—DOR), and the tail of the snake destroyed. If the user uses a dichotomy key, and if one of the queries in the train of logic is to determine if the tail has a rattle, then the user cannot continue with the key and cannot identify the snake.

Another example is in bird watching. If an individual is watching a bird, the user may not be able to recognize the identifying characteristics that a dichotomy key requires. For example, a question in the dichotomy key may be "What is the color of the bird's bill?" If the user is looking at the bird from the back, the user may not be able to determine the color of the bill. Since the answer to the quire cannot be determined, the user cannot continue in the dichotomy logic sequence. The user will not know which question to answer next and cannot determine the identity of the bird.

There is a strong need for a method or system that assists an individual to identify an animal, plant, or item with numerous characteristics that are readily identifiable and can be applied in any order. There should be an ample supply of the alternate characteristics.

SUMMARY OF THE INVENTION

The present invention is a system for identifying and separating an item that has a specific "set" of characteristics from other items that have different "sets or combinations" of characteristics.

Characteristics can be stored in a computer databank for various plants, animals, and items. When a user wants to identify a particular plant, animal or item, the user supplies the characteristics that are readily ascertained. After the user has entered the characteristics, the standardized reverse logic databank of the present invention will cull out the items that have non-compatible characteristics and identify the item or provide a list of the possible identity matches for the unknown.

The present invention provides a reliable system to identify a plant, animal or item, even if some of the characteristics are not ascertainable. For example, if a user finds a snake that has been killed on the road, and the user cannot determine the characteristics of the snake's head because the head has been destroyed, the user can enter the body and tail characteristics that are still available. It may be possible to determine if the belly scales are transverse, if the body has rings, spots, or stripes, and if the tail has a rattle. When the characteristics are entered into the present invention, the name of the snake will appear and the snake will be identified. If there are not enough characteristics to identify the snake, a list of the remaining names will appear.

The user can quickly, easily, and reliably identify the snake in question with the present invention. However, in similar situations, the relevant art key can be blocked without the head characteristics and the user cannot identify the specimen.

DETAILED DESCRIPTION OF THE PREFERRED EMBODIMENT(S)

Figure 1:
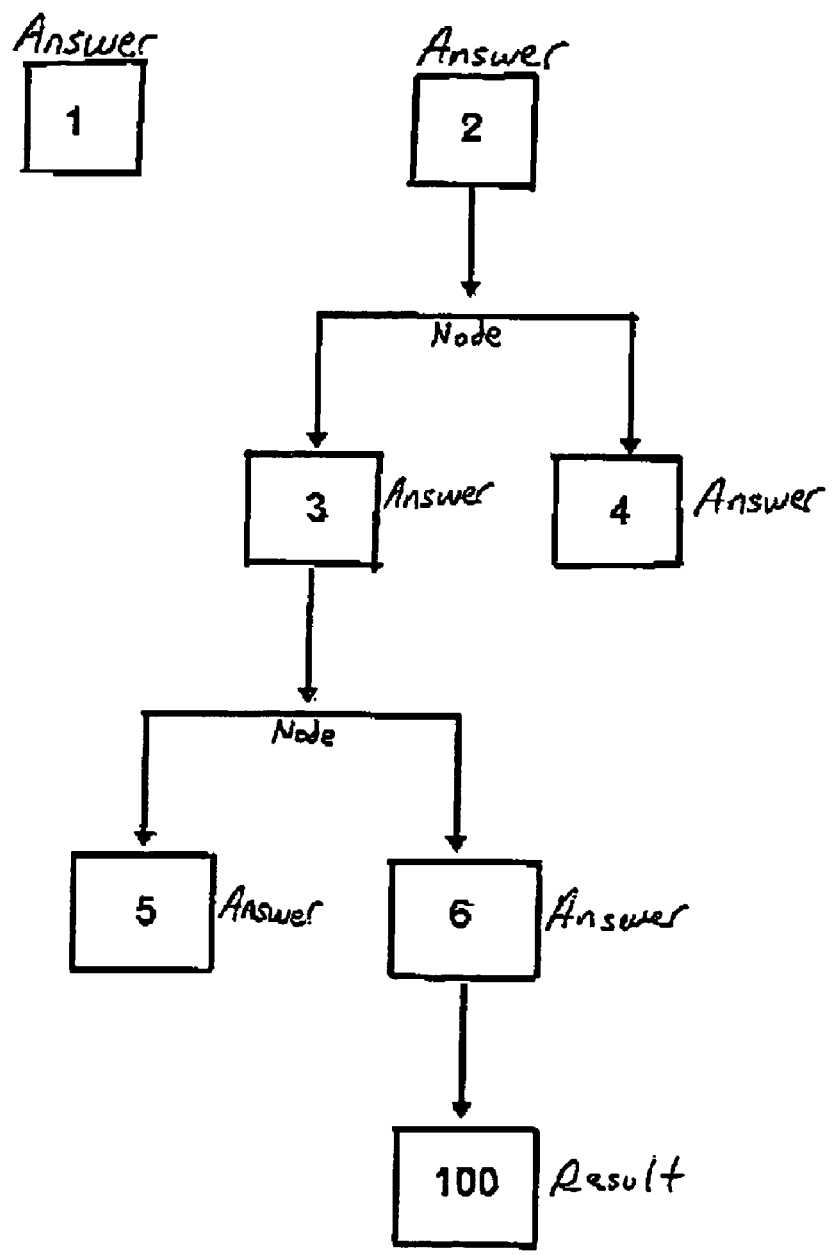
FIG. 1 shows a flow chart of the relevant art.

The relevant art is a type of decision tree. When a decision is made, the user is instructed to make another decision, and another decision, and so on, until enough decisions have been made and only one possibility remains. FIG. 1 illustrates the relevant art. With reference to FIG. 1, relevant art typically has two questions or answers from which to choose.

Let us start this example with a snake that has the following observed values: Ventrals considerably enlarged (2); Large deep pit in loreal region (3); Tip of tail with rattle (6).

For example in FIG. 1 the process starts with the answers (1) and (2). An individual using the relevant art would look at the animal, plant, or object to determine whether the observed characteristic fits the first answer (1) or the second answer (2). In this example the feature fits answer (2) so the individual goes to the next node where there are two answers. This node will be examined and again the user will see which of answers (3) or (4) fits the observed value. In this example, there is a large deep pit in loreal region. So, answer (3) would be the answer to follow. Since the tip of the tail has a rattle, the answer (6) is followed and the genus is (100) *Crotalus*.

The relevant art would tell the user that based on the answer (6) that there is a definite result (100) identifying the type of snake. Such an approach of the relevant art is literally like a decision tree, where once a decision is made, the individual is instructed to make another decision, and another decision, and so on, until eventually, enough decisions have been made so there remains only one or two possibilities for the positive identification of a plant, animal, or other object. However, if a question cannot be answered, then the other questions cannot be answered and no identification is possible.

Figure 2:
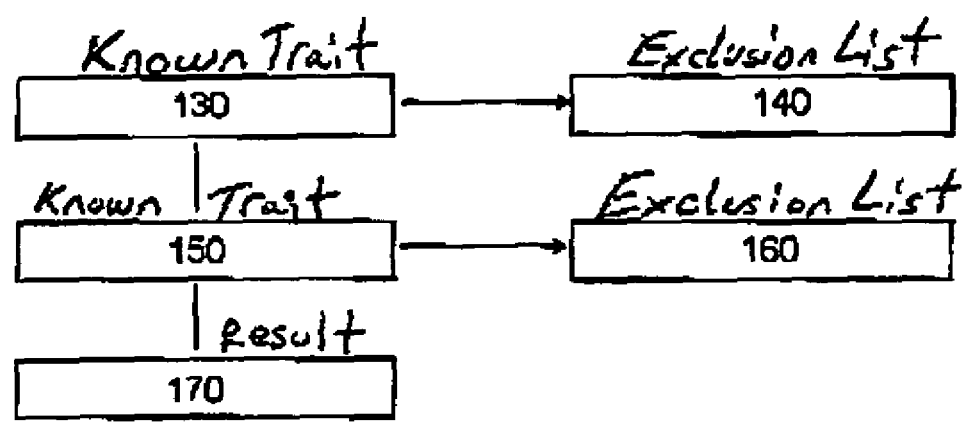
FIG. 2 shows a flow chart of the present invention.

The present invention is shown in FIG. 2. FIG. 2 shows that there is a first known trait (130), and there is a second known trait (150). Corresponding to first known trait (130) is a first known exclusion list (140). Corresponding to second known trait (150) is a second known exclusion list (160). Of critical importance is that each trait has a unique exclusion list, and that the traits can be entered in any order by the user. When the user chooses the first known trait (130), then chooses the second known trait (150), etc., the user is gradually choosing traits to enter and the associated exclusion lists (140, 160, etc.) remove possible identifications so that the plant, animal, or other object can be properly identified.

The trait-exclusion or non-compatible relationship is crucial to the operation of the present invention. For example, if an individual comes across a snake and examines the snake, the individual chooses the characteristic to apply with the present invention. There is no prompt required by the present invention. The present invention will not prompt the user and say, "Identify the shape of the snake's pupils", or "Does the snake's body have bands?" The present invention can prompt the individual to provide various characteristics. However, the user can certainly apply other characteristics that may be more convenient to determine. An individual could look at a snake, and if the snake was run over, the individual may not be able to provide any identification information pertaining to the snake's head. The individual, may be able to provide information about the pattern on the snake's body, the tail of the snake, the location where the snake was found (in what country), and any identification markings on the underside of the snake. The individual would realize that the characteristics are available and identifiable, and would use the characteristics in the present invention.

When the individual provides the first known trait (130), the present invention would recognize the first known trait (130) and would invoke the first known list of exclusions (140) because they conflict with the first known trait (130). For example, if the individual were to apply the first known trait (130) which is that the snake has round pupils, then the present invention would implement the first known exclusion list (140). The exclusion list is vestigial, elliptical horizontal, and elliptical vertical pupils. This exclusion list is applied because, if the individual recognizes that the snake has round pupils, the snake cannot possibly have vestigial, elliptical horizontal, or elliptical vertical pupils. Each non-compatible characteristic that is included in the exclusion list (140) may be associated with one or more of the snakes. All snakes associated with the first known exclusions list (140) would be culled out by the present invention, so that the remaining matching identities (150) could not include any snakes that have characteristics that are associated with the first known exclusions list (140).

Similarly, the individual using the present invention would look for a second known trait (150). For example, if the user sees that the head of the snake has a loreal scale, then the user would enter that the loreal is present as the second trait (150).

The second known trait (150) is associated with a non-compatible exclusion list (160). For example, the second known exclusion list (160) is when the loreal is absent. Obviously, if a snake has a loreal, the loreal cannot be absent. So, if the second known trait (150) is a loreal, and the second known exclusion list (160) is loreal—absent, then all the snakes that have no loreal will be removed from the remaining list of possibilities.

An important point to recognize about the present invention is that it allows the user to enter known traits in any order that the user desires. In another embodiment of the present invention, prompts can be provided to assist the user. However, the present invention does not use a decision tree type analysis like the relevant art. A databank is part of the present invention and can take any form. The databank can be part of a computer operating system of a laptop, a personal data assistant, an internet-enabled phone, et cetera. The present invention requires a databank so that as known traits are entered, the traits can be matched to the known non-compatible exclusions in the standardized databank, and the animal, plant or object identified.

A major disadvantage of the relevant art is that the relevant art, because of its decision tree analysis, requires comprehensive updating, if the characteristics for the identification of an animal, a plant or an object need to be modified in the future. For example, if five new types of snakes are identified, and there are new characteristics associated with the five new types of snakes, the relevant art would require new branches of the decision tree to allow the user to arrive at the proper result.

With the present invention, and with reference to FIG. 2, if more than the characteristics shown in FIG. 2 are required then another known trait can be added and associated with its corresponding exclusions list; the important point is that the entire databank of the present invention does not need to be modified, but merely augmented, as opposed to the relevant art that would need to be completely remapped because of the changes in the characteristics and snake identification.

The aforementioned example also allows the present invention great flexibility to expand. For example, if the present invention has known traits for snakes in North America, in the future, additional traits for snakes in South America can be easily added. Whereas, with the relevant art, new mapping of a decision tree would have to be done. The relevant art would have to be restructured and rewritten, however, with the present invention, more traits can be easily added and associated with their non-compatible exclusions. In the invention, the majority of the initial traits would be applicable as well as their corresponding non-compatible exclusions lists.

Most importantly as well, the present invention allows for the possibility of uncertain data. For example, if the individual user cannot determine the shape of a snake's pupils, the user can omit the characteristic regarding the shape of the pupils. The present invention will still function if a characteristic is not provided because there is no direct relationship between the different characteristics. For example, the first known trait (130), the round pupils of the eyes, and the second known trait (150), the absence or presence of a loreal, are merely queries, and do not correspond to one another in any particular fashion. Whereas, in the relevant art, if the user cannot provide the shape of the snake's pupils, the relevant art would not be able to direct the user to the next characteristic because an answer must be provided for the shape of the snake's pupils.

The present invention uses known traits in any sequence desired, unlike the relevant art. It is contemplated that any conventional technology could be used to implement the present invention. As with most technologies, a more comprehensive databank and a faster processor will provide faster results.

The present invention provides for any characteristic to be selected. The present invention makes use of a databank so when a characteristic is selected, the characteristic is linked to a list of secondary characteristics that are in direct conflict with the primary characteristic. The link is a unique and important part of the present invention.

The databank of conflicting characteristics is not related to any specific snake and can be built entirely at one databank location. Another databank has a list of the actual or primary characteristics of each snake. When the characteristic of an unknown specimen is selected, the characteristic is linked to the list of conflicting characteristics. It is then that each snake that has conflicting characteristics is removed from the list of possible snakes. The method is entirely different from other keys and uses a reverse logic.

In the practical application, the conflicting characteristic exclusion relationship is crucial to the operation of the present invention. For example, if an individual examines a snake and selects a characteristic to use in the present invention, there is no prompt that requires a specific characteristic. The present invention does not prompt the user and ask specific questions like "What is the shape of the snake's pupils" or "Does the body have rings?" The present invention allows the user to select a characteristic from a list of several hundred characteristics. The number of characteristics is only limited by the capacity of the computer system.

The present invention can provide suggestions or prompts to assist with the identification, however, the user does not need to follow the suggestions and can enter the characteristics that the user finds appropriate.

A major advantage to the present invention is that missing characteristics do not interrupt the key. If a snake's head is missing, there may be adequate body and tail characteristics to identify the specimen.

An important point to recognize about the present invention is that it allows the user to select the characteristics in any sequence. Prompts can be provided to assist the user in the present invention, but the user does not need to follow the suggestions. The present invention does not use a decision tree type analysis like the relevant art.

Databanks are a part of the present invention and can be in many forms. The databank can be in a laptop computer operating system or in a large complex system. The present invention requires some type of accessible databank, so when the characteristics of the unknown are entered, the characteristics can be linked to lists of non-compatible exclusions and the identity of the item discovered, or the search narrowed down.

Because the relevant art is based on a decision tree analysis, the relevant art requires considerable updating when the characteristics that identify an item are changed. If new types of snakes are entered in the list of snakes and there are new characteristics associated with the entries, the relevant art system will require new decision tree branches so the user can arrive at the proper result.

With the present invention, if new types of snakes are added to the databank, in most cases, all that needs to be added is a list of the specific characteristics for each snake. The present invention does not use a decision tree type analysis, and no re-mapping needs to be done and no new paths need to be created.

If new characteristics are required, the characteristics can be added and associated with corresponding lists of conflicting characteristics. The important point is that the entire databank of the present invention does not need to be modified, but merely augmented, as opposed to the relevant art system that would have to be re-mapped because of the changes in the characteristics.

The present invention has great flexibility to expand. If a databank of the present invention has only the characteristics for the snakes in North America, additional characteristics for the snakes in South America can added easily if needed. However, the characteristics for the snakes in North America, in most cases, will be applicable and sufficient to describe the snakes of South America. Whereas, with the relevant art, the decision tree would have to be remapped, restructured, and rewritten.

Another important point is that the present invention allows for the use of uncertain data. For example, if the individual user is not sure of the shape of a snake's pupils, the user does not have to use the characteristic. The present invention will still function because the relationships between different characteristics are not related to each other in any particular fashion. Whereas, in the relevant art, if the user cannot determine a required characteristic, the relevant art cannot direct the user to the next question.

In summary, the present invention is based mainly on the databank of characteristics and the associated databank of conflicting characteristics. When the databanks are prepared, and a list of the characteristics for each of the various items entered into another databank, the RL key can identify the items as required.

Further the present invention has a databank that does not need to be changed and can be developed to include the snakes that are found Worldwide.

Additionally, the present invention is structured so a databank can be developed easily for numerous other items like orchids, trees, birds, flowers, shells, etc. A list of general descriptive characteristics for orchids can be prepared and a list of the associated non-compatible characteristics for each of the general characteristic developed. Then, the characteristics for each orchid species can be added and the reverse logic key is complete. The key is automatically standardized.

Further the present invention has databanks that can be started somewhere for each item (reptiles, birds, etc) and the system can be used to identify items by anyone with a copy of the databank. The inventor's goal is to see that the databanks are developed in the USA.

The present invention's reverse-logic key is very efficient because each characteristic entered removes items that have both directly and indirectly conflicting characteristics. For example, a snake with a round pupil characteristic will affect the removal of snakes that have vertical pupils and also those with vestigial pupils. The present invention removes items that have characteristics that conflict with the unknown's characteristics, not just items that do not have the characteristic.

The present invention is more efficient than the relevant art. The relevant art divides the items considered each time and requires more nodes and more information than the RL key to identify an item.

The present invention is standardized from the start. The basic databank of non-compatible characteristics will be the same throughout the World. The descriptions of the species have to be the same throughout the World. In the relevant-art keys each investigator designs the key in a different way and it would be extremely difficult to standardize such a system. The relevant art is tailor made for each group of items—not so with the present invention.

In short, the present invention takes known traits in any sequence desired, unlike the relevant art. Any conventional technology can be used to implement the present invention. The present invention is not limited to the embodiments herein aforementioned, and it is contemplated that the present invention is any and all embodiments within the scope of the following claims.

What is claimed is:

1. A characteristic-based classification system for snake identification, comprising:

storing characteristics of snakes in a databank;

supplying characteristics, from a user to the databank, readily ascertained from observing an unknown snake to be identified;

culling out items that have non-compatible snake characteristics in comparison to the snake characteristics that have been ascertained from observing the unknown snake to be identified, said culling out performed by the databank; and providing, from the databank to the user, a list of possible identity matches for the unknown snake to be identified.

2. The system of claim 1, further comprising the step of querying a user of the system about characteristics readily ascertained from observing an unknown snake to be identified.

3. The system of claim 1, further comprising the step of increasing the number of characteristics of snakes in the database without forcing a rewrite or revamping of the existing characteristics of snakes in the databank.

4. The system of claim 1, wherein the step of supplying characteristics of snakes readily ascertained from observing an unknown snake to be identified can be supplied in any order of characteristics.

* * * * *